US006276386B1

(12) United States Patent
Stubbeman

(10) Patent No.: US 6,276,386 B1

(45) Date of Patent: Aug. 21, 2001

(54) CHARGING DEVICE FOR HYDRAULIC SYSTEMS

(75) Inventor: Robert Diedrich Stubbeman, Houston, TX (US)

(73) Assignee: Kvaerner Oilfield Products, Inc., Houston, TX (US)

(*) Notice: Subject to any disclaimer, the term of this patent is extended or adjusted under 35 U.S.C. 154(b) by 0 days.

(21) Appl. No.: 08/976,894

(22) Filed: Nov. 24, 1997

(51) Int. Cl.[7] .......................... F16K 31/50; F16L 37/28; E21B 34/02

(52) U.S. Cl. .............................. 137/15.18; 137/315.02; 137/322; 137/614; 166/87.1; 166/91.1; 166/97.1; 166/242.6; 166/330; 251/148

(58) Field of Search .............................. 137/321, 322, 137/323, 315, 614, 15.17, 15.18, 315.01, 315.02; 251/148, 149.6, 149.5, 149.1; 166/242.6, 330, 332.1, 332.2, 87.1, 91.1, 97.1, 316; 175/91

(56) References Cited

U.S. PATENT DOCUMENTS 932,153 * 8/1909 Martin .............................. 137/322
2,203,922 * 6/1940 Paisley .............................. 251/148
2,213,309 * 9/1940 Fortune .............................. 166/97.1
2,233,077 * 2/1941 Gillespie et al. .................... 166/67
2,271,535 * 2/1942 Barker .............................. 166/91
2,765,806 * 10/1956 Webster .............................. 137/322
2,775,256 * 12/1956 Hanson .............................. 137/322
2,979,072 * 4/1961 Webster .............................. 137/322
3,272,222 * 9/1966 Allen .............................. 137/315
3,645,496 * 2/1972 Rawlins .............................. 251/148
3,739,846 6/1973 Beson .............................. 166/89
3,965,977 6/1976 Beson .............................. 166/88
4,069,686 * 1/1978 Hoelman .............................. 137/322
4,384,591 * 5/1983 Tan .............................. 137/322
4,444,220 * 4/1984 Seger .............................. 137/315
4,503,878 * 3/1985 Taylor .............................. 137/315
4,527,587 * 7/1985 Fairlamb .............................. 251/149.6
4,703,774 11/1987 Seehavsen .............................. 137/614
4,709,725 12/1987 Morrison .............................. 137/614
4,796,922 1/1989 Prichard .............................. 285/26
4,825,945 * 5/1989 Smith .............................. 166/87.1
4,852,611 8/1989 Knerr et al. .............................. 137/595
4,921,013 * 5/1990 Spalink et al. .................... 137/614.05
5,010,913 * 4/1991 Clements .............................. 137/322
5,076,324 * 12/1991 Herman et al. .................... 137/614.06
5,139,049 * 8/1992 Jensen et al. .................... 137/614.05
5,370,153 * 12/1994 Galle .............................. 137/614.04

FOREIGN PATENT DOCUMENTS

734806 * 8/1955 (GB) .............................. 137/322
2097885 11/1982 (GB) .
2132728 7/1984 (GB) .
2184508 6/1987 (GB) .
2195158 3/1988 (GB) .

* cited by examiner

*Primary Examiner*—George L. Walton
(74) *Attorney, Agent, or Firm*—Wendy K. Buskop; Buskop Law Group

(57) ABSTRACT

There is described herein an apparatus for charging a fluid line through a coupler such as a penetrator. The apparatus comprises a body formed from a sidewall defining a bore positioned along the longitudinal axis and extending therethrough. The first end of the body forms a substantially flat face. There is a stem positioned within the bore of the body and being movably mounted in the body for movement from a first position to a second position with respect to the body. There is a valve means attached to the apparatus for filling the body with hydraulic fluid. The substantially flat face of the body is fastened to a coupler. There is also an adjustment means attached to the stem for adjusting the position of the stem within the body. A method for charging a downhole hydraulic system is also described. There is also a method for installing a tubing hanger having a production string depending therefrom in a subsea wellhead while maintaining a hydraulically actuated downhole valve in an open position.

23 Claims, 7 Drawing Sheets

CHARGING DEVICE FOR HYDRAULIC SYSTEMS

BACKGROUND OF THE INVENTION

In one aspect, the present invention relates to a charging device suitable for use with a tubing system. In another aspect, the present invention relates to a method for pre-charging a tubing system to facilitate further assembly of a unit which contains the tubing system.

One type of subsea wellhead used in the oil and gas industry is the horizontal, or side valve tree (SVT). The SVT is formed from a spool body having a through passage for tubing placement and a side outlet for production. A tubing hanger having a through passage and a side outlet is positioned in the spool body, with the side outlet of the tubing hanger positioned in flow communication with the side outlet in the spool body, usually in alignment. The production tubing string extends downwardly from the tubing hanger, and the through passage through the tubing hanger is sealed above the side outlet of the tubing hanger, so that production fluids will flow up the production string and then turn to flow through the side outlets of the tubing hanger and the spool body.

A downhole safety valve is carried by the production tubing. This valve is hydraulically actuated. One of the challenges in side valve tree design is in providing hydraulic connectivity between the downhole safety valve and the rig or platform on the surface across an interface situated in the SVT.

A highly suitable assemblage for providing such hydraulic connectivity is disclosed in U.S. Pat. No. 5,582,438 to Wilkins et al. issued Dec. 10, 1996, the disclosure of which is incorporated herein by reference. This assembly relies on a pair of coupling elements, one carried in the spool body, the other by the tubing hanger assembly to establish the hydraulic flow passage when the tubing hanger assembly seats in the spool body. A difficulty, however, is sometimes presented in operation of this device, as well as other similar devices, as the tubing hanger assembly is lowered downhole. The problem is that the downhole safety valve, which is carried in the production tubing string, is designed to fail in the closed position in the event that its supply of hydraulic fluid pressure is interrupted. The valve being in the closed position as the tubing string is lowered downhole prevents fluid flow through the tubing string, and can cause problems in seating the tubing hanger in the spool body.

A method for maintaining the downhole safety valve in the open position as the tubing string is lowered into the well would be very desirable.

An apparatus which is well suited for causing the downhole safety valve to stay in the open position as the tubing string is lowered into the well would be very desirable.

OBJECTS OF THE INVENTION

It is an object of the present invention to provide a charging device for pre-charging a hydraulic system.

It is another object of the present invention to provide a system for testing and actuating downhole equipment.

It is another object of the present invention to provide a method for maintaining a downhole valve in an open position while the tubing string is lowered downhole.

SUMMARY OF THE INVENTION

One embodiment of the present invention is directed to an apparatus for charging a fluid line through a coupler such as a penetrator employed in a SVT. The apparatus comprises a body having a longitudinal axis, a first end and a second end. The body is formed from a sidewall defining a bore positioned along the longitudinal axis and extending therethrough. The first end of the body forms a substantially flat face. There is a stem having a portion positioned within the bore of the body and being movably mounted in the body for movement from a first position to a second position with respect to the body. The sidewall defines a port that extends therethrough and communicates with the bore. A valve means is mounted outside of the sidewall and positioned in flow communication with the port. The valve means is used to fill the body with hydraulic fluid as described below. There is a means adjacent to the first end of the body for fastening the substantially flat face of the body to a coupler. There is also an adjustment means attached to the stem for adjusting the position of the stem within the body. This construction enables the attachment of a charging device to a coupler that can effectively charge the hydraulic system extending from the coupler.

In another embodiment, there is provided a method for charging a downhole hydraulic system. The method employs a charging device as described above to charge hydraulic system through a coupler or hydraulic penetrator, in most cases, with hydraulic fluid.

According to the method, the charging device is charged with hydraulic fluid. The stem is moved so that the stem contacts the valve means in the coupler and moves the valve means to an open position. The hydraulic system is charged with hydraulic fluid to a desired pressure through the valve means on the charging device. A downhole valve is opened with the hydraulic pressure. The valve means in the coupler is then closed to maintain the desired pressure within the hydraulic system so that the downhole valve remains in an open position.

This same method may also be employed in the reverse to release the pressure from the hydraulic system, to close and/or test a particular downhole valve.

In another aspect of the invention, there is also provided a method for installing a tubing hanger having a production string depending therefrom in a subsea wellhead while maintaining a hydraulically actuated downhole valve in an open position.

DETAILED DESCRIPTION OF THE PREFERRED EMBODIMENTS

Figure 1:
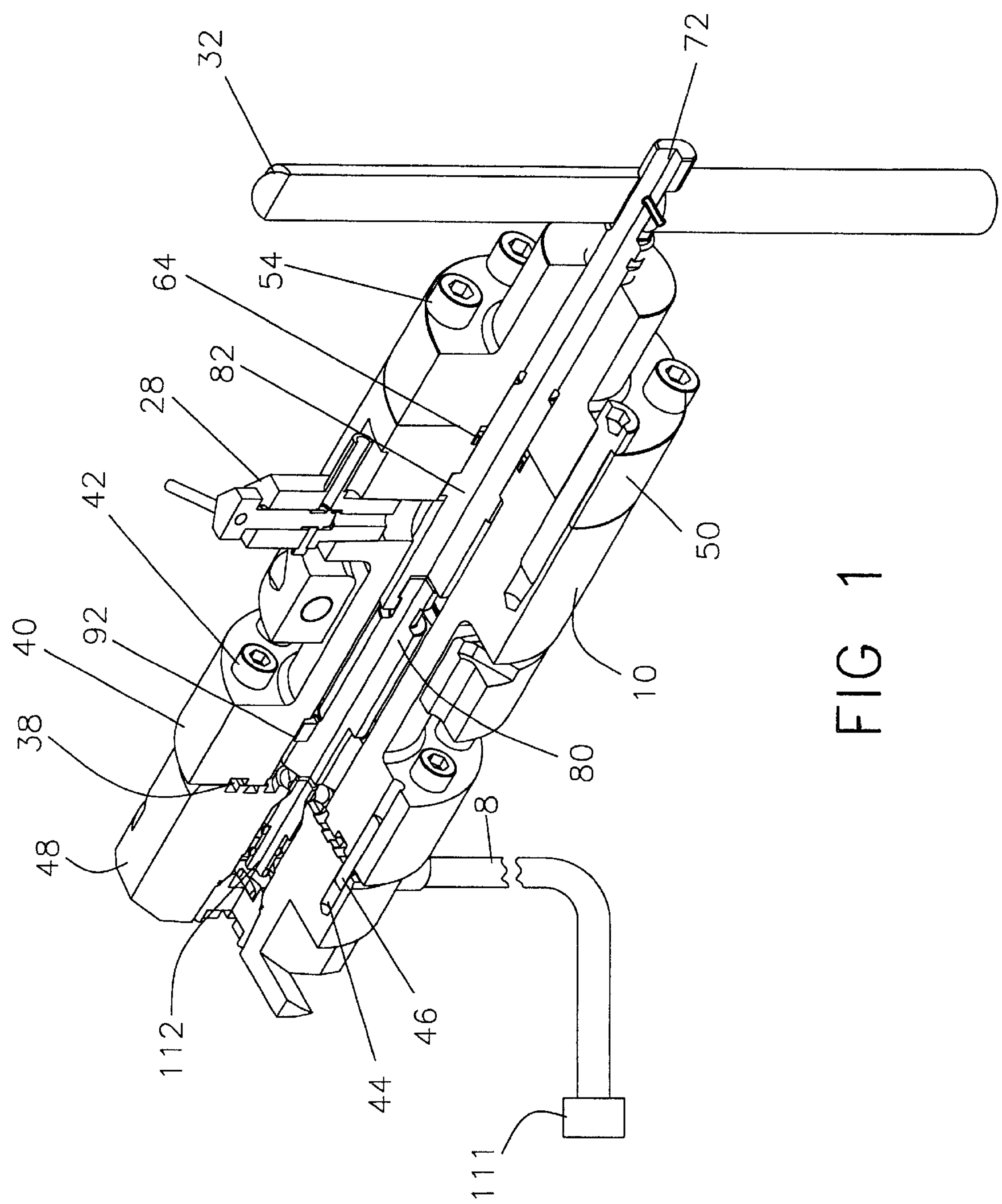
FIG. 1 is a pictorial view of the apparatus with a one-quarter cut-away.

As shown in FIGS. 1–7, one embodiment of the present invention is directed to an apparatus 6 for charging a fluid line 8 through a coupler such as a penetrator. The apparatus 6, sometimes referred to herein as a charging device, comprises a body 10 having a longitudinal axis 12, a first end 14 and a second end 16. The body 10 is formed from a sidewall

Figure 2:
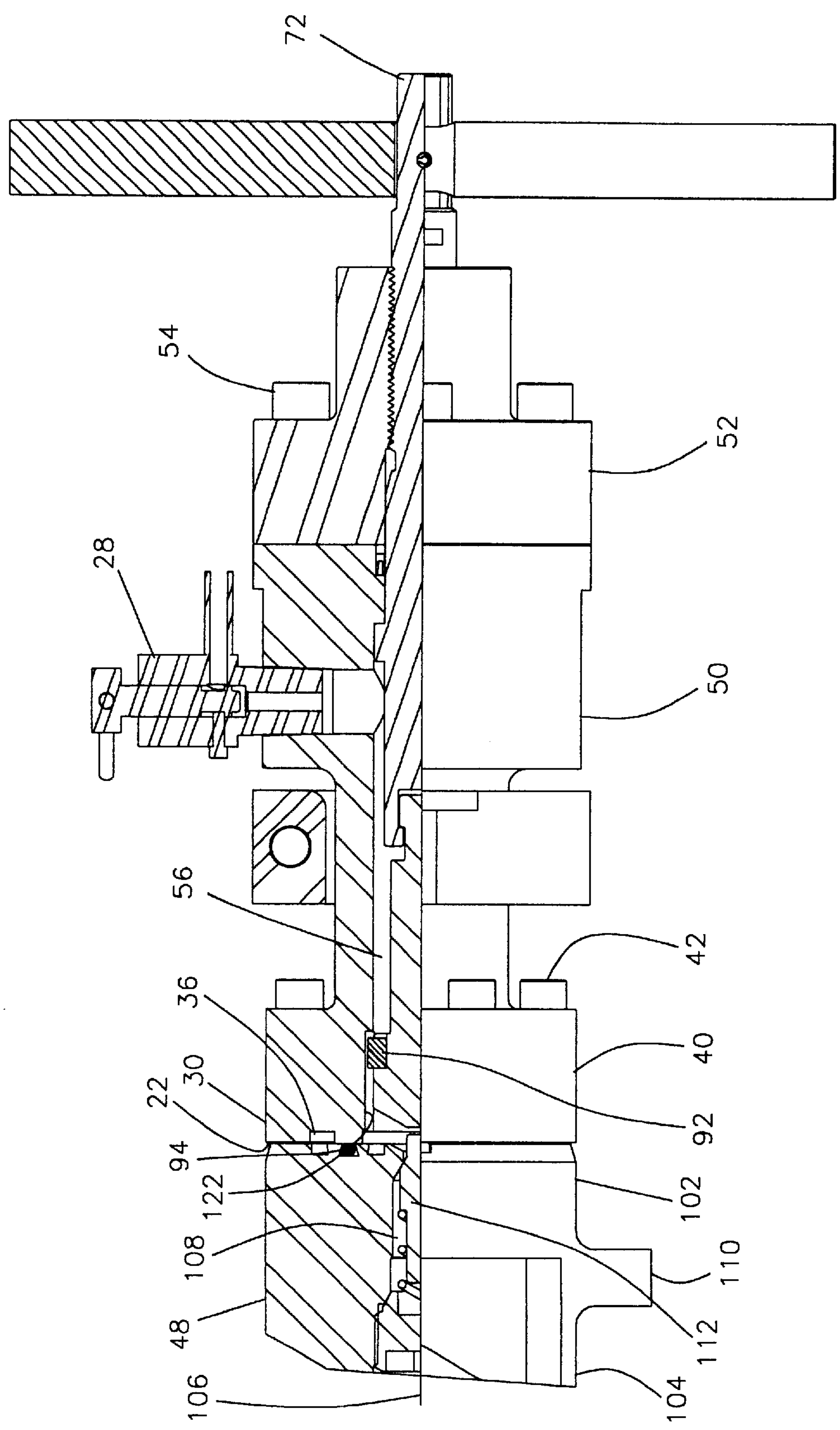
FIG. 2 is a partial side-sectional view of the apparatus.
Figure 3:
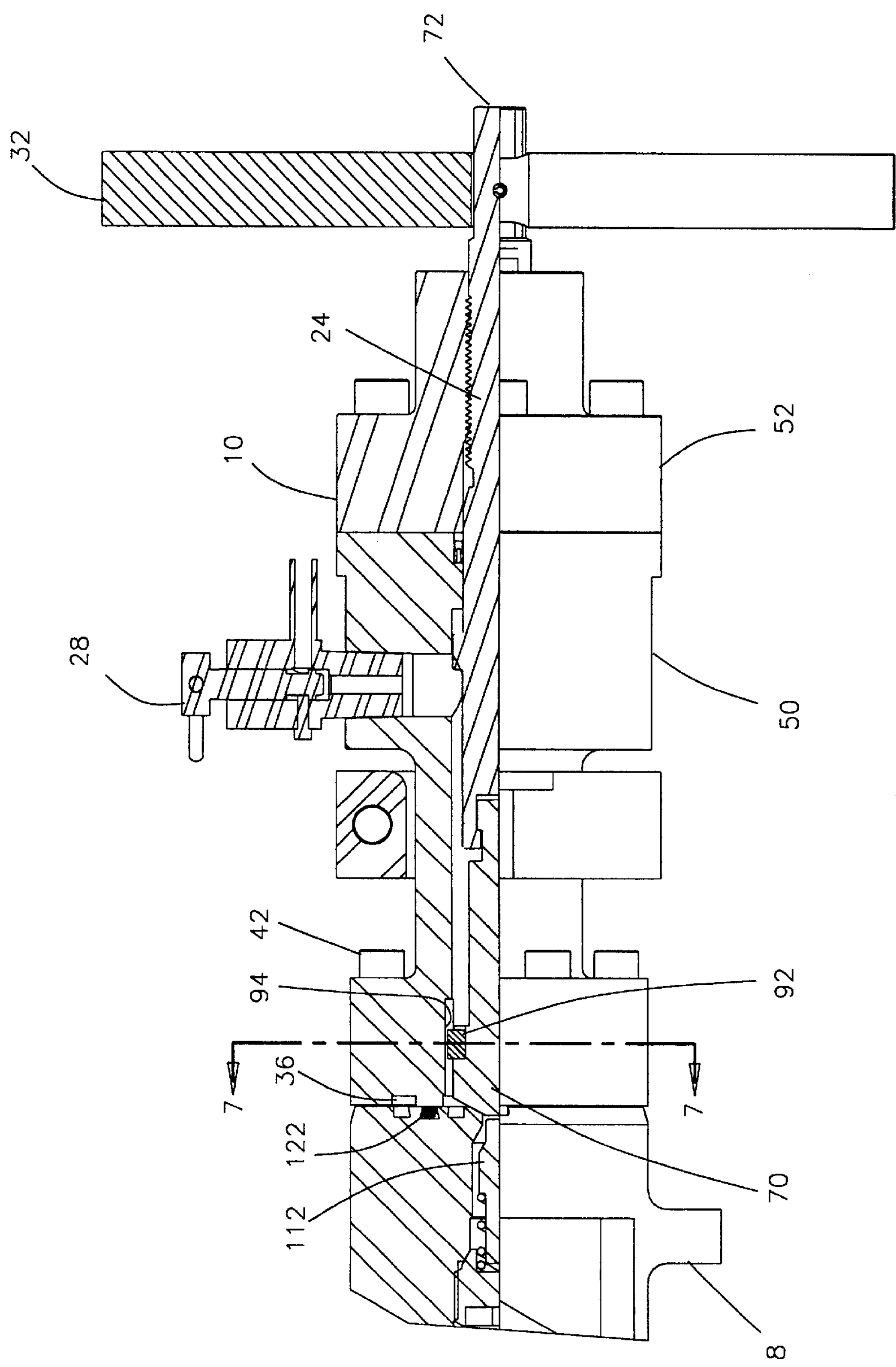
FIG. 3 is another partial side-sectional view of the apparatus in another configuration.

18 defining a bore 20 positioned along the longitudinal axis and extending therethrough. The first end 14 of the body 10 forms a substantially flat face 22. There is a stem 24 having a portion positioned within the bore 20 of the body 10 and being movably mounted in the body 10 for movement from a first position to a second position with respect to the body 10. The first position is shown in FIG. 2 where the stem 24 is not protruding from the body 10 and the second position is shown in FIG. 3 where the stem 24 is protruding from the body 10. The sidewall 18 defines a port 26 that extends therethrough and communicates with the bore 20. A valve means 28 is mounted outside of the sidewall 18 and positioned in flow communication with the port 26. The valve means 28 is used to fill the body 10 with hydraulic fluid as described below. There is a means 30 adjacent to the first end of the body 10 for fastening the substantially flat face 22 of the body 10 to a coupler. There is also an adjustment means 32 attached to the stem for adjusting the position of the stem 24 within the body 10.

In a preferred embodiment, the substantially flat face 22 of the body 10 defines a periphery 34 and at least one annular recess 36 extending around the longitudinal axis for receiving a circular metal seal 38. The at least one annular recess 36 is positioned within the periphery of the substantially flat face 22. The at least one annular recess 36, prevents damage to the face of the coupler and any metal seals it may contain. A sealing means 122 such as an o-ring can be used to form a seal between the body 10 and the coupler face as shown in FIG. 3.

Figure 4:
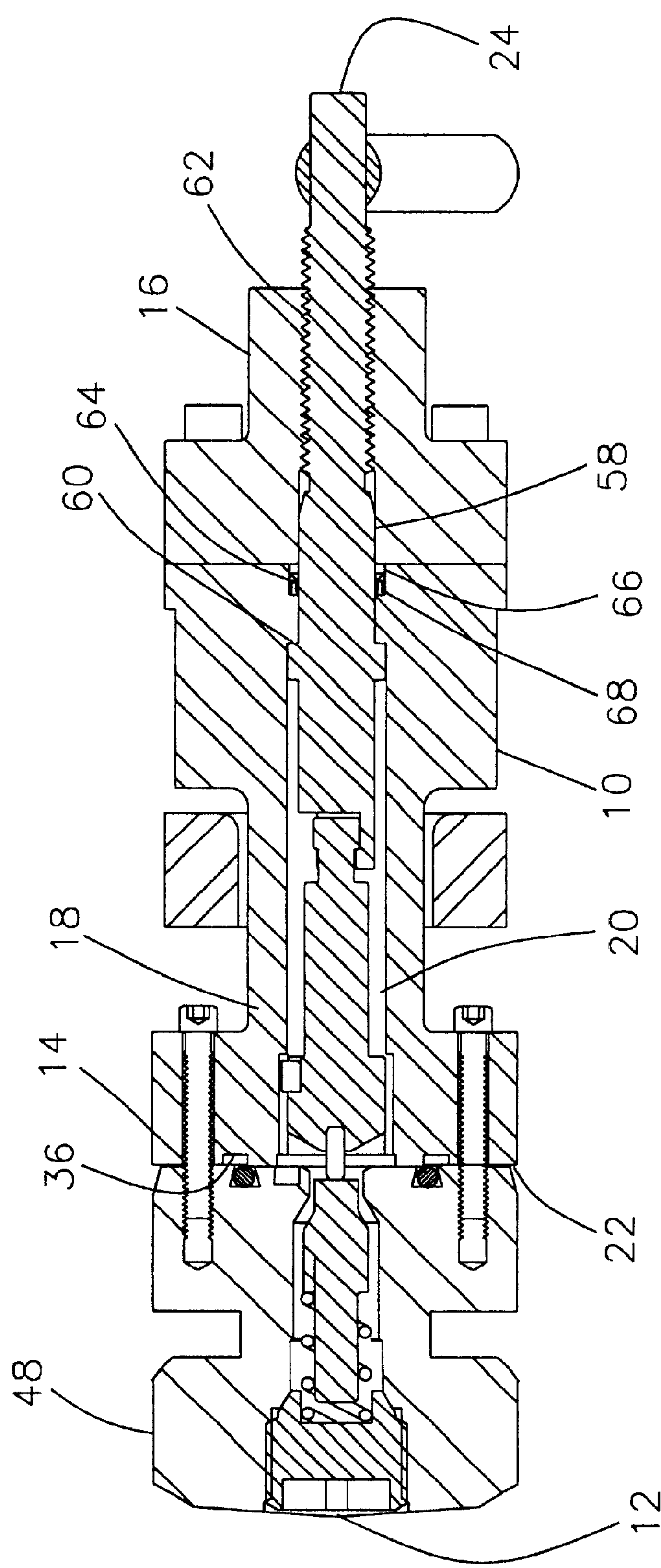
FIG. 4 is full side-sectional view of the apparatus.
Figure 5:
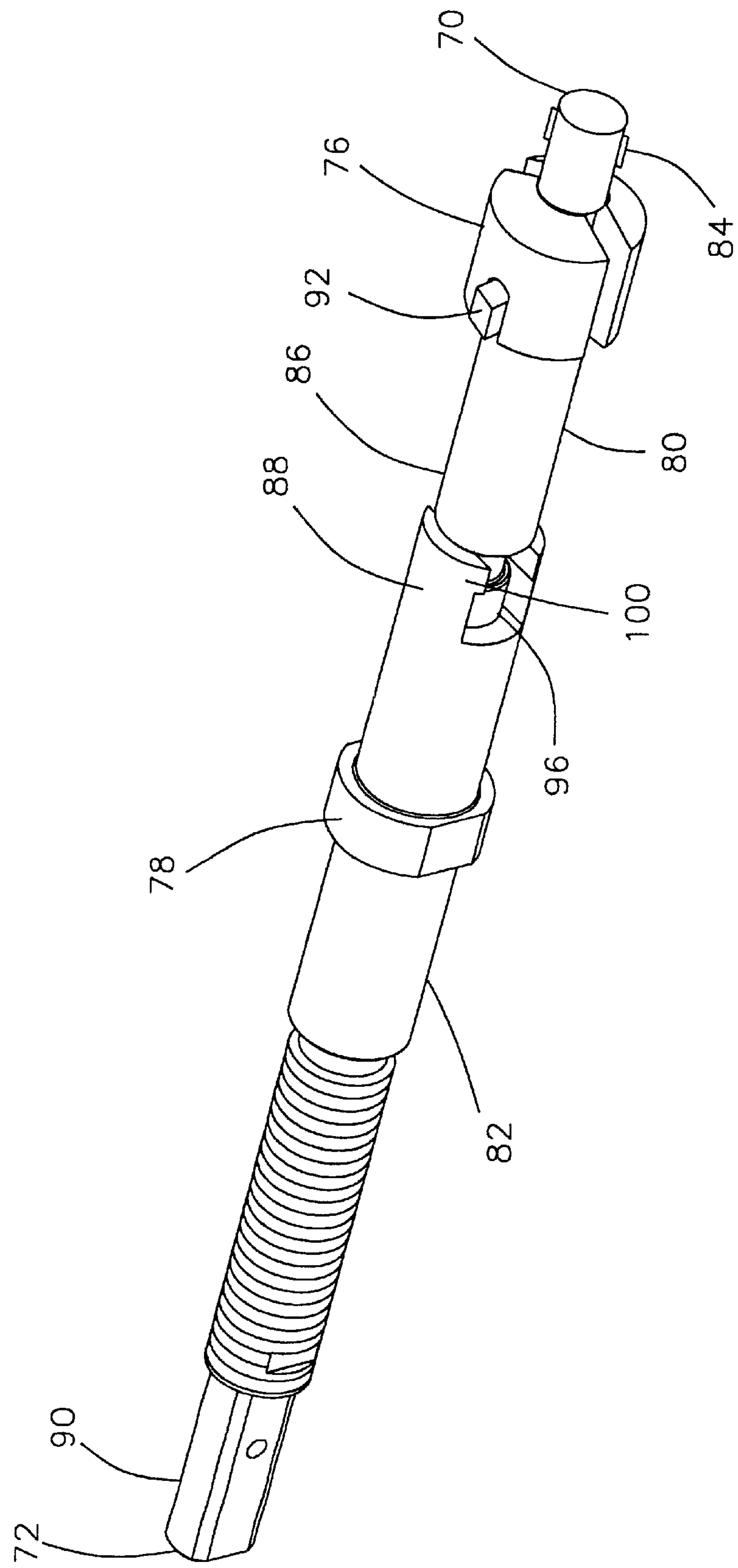
FIG. 5 is a pictorial view of the stem.
Figure 6:
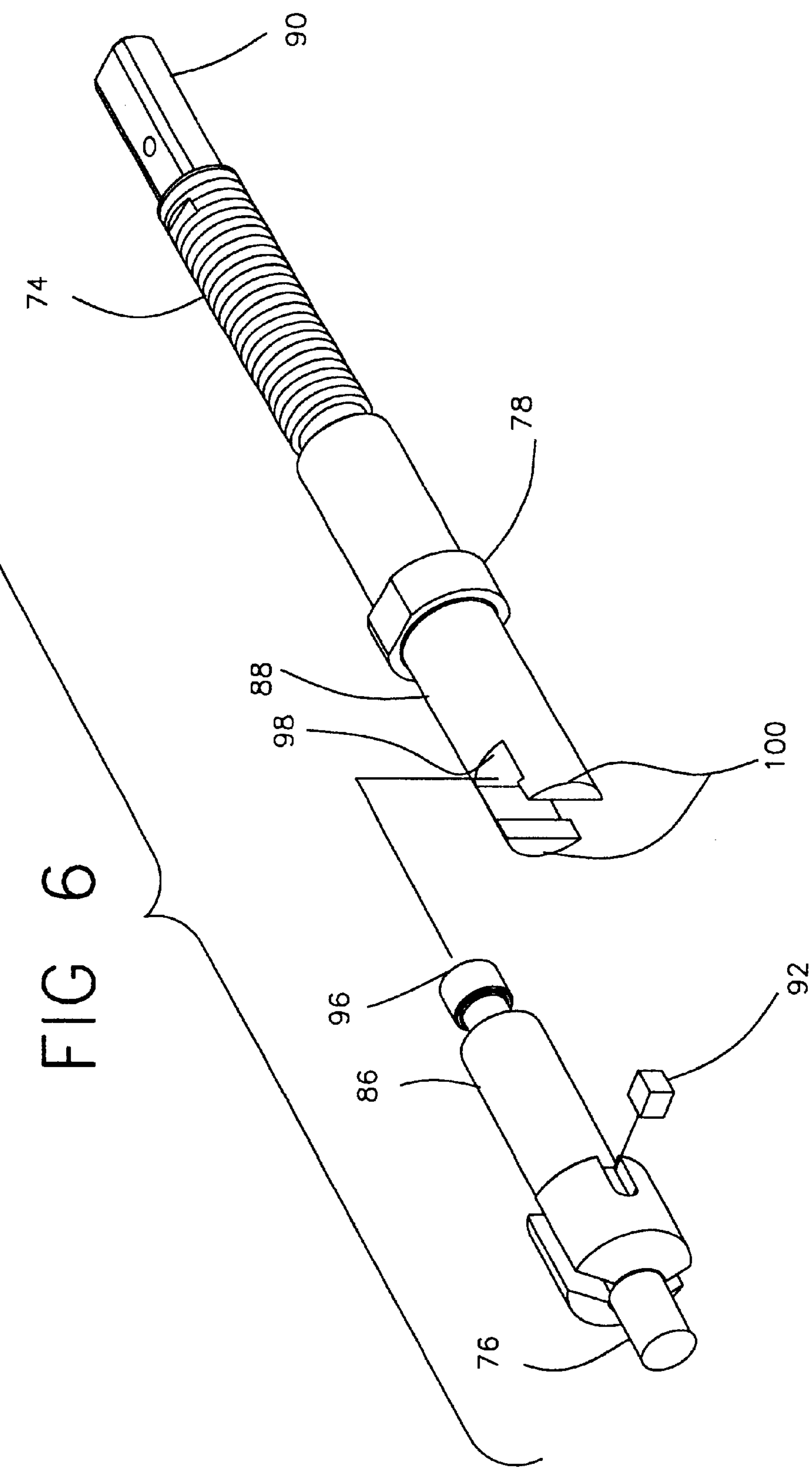
FIG. 6 is an exploded pictorial view of the stem.
Figure 7:
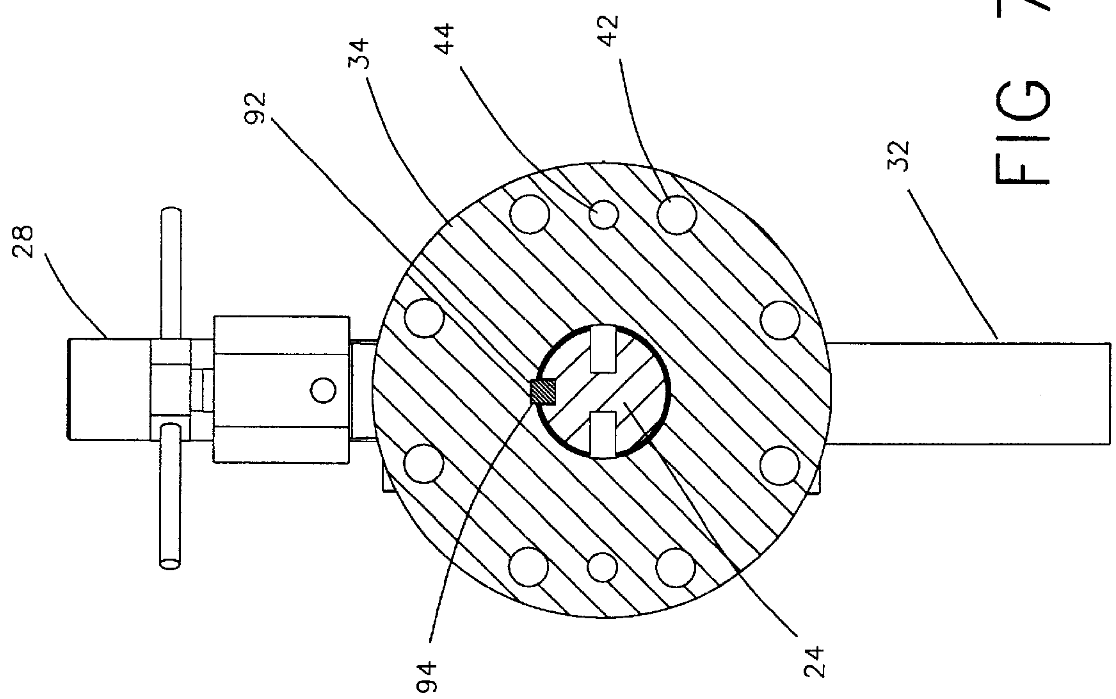
FIG. 7 is a cross-section taken along cut lines 7—7 of FIG. 3.

Preferably, the fastening means 30 comprises a flange 40 and a first plurality of bolts 42 extending through the flange 40 parallel to the longitudinal axis of the body 10 as shown in FIG. 4. The plurality of bolts 42 are positioned between the periphery 34 and the at least one annular recess 36. The flange preferably defines a channel 44 for receiving a guide means 46 for aligning the apparatus with a coupler 48.

In a preferred embodiment, the body 10 has a first portion 50 and a second portion 52. The second portion 52 is attached to the first portion 50 by a second plurality of bolts 54. Additionally, the bore 20 is defined by a first cylindrical inside wall portion 56 near the first end 14 of the body 10 and a second cylindrical inside wall portion 58 that is separated from the first cylindrical inside wall portion 56 by a first annular wall portion 60 facing the first end 14 of the body 10. The second cylindrical inside wall portion 58 defines threads 62 near the second end of the body 10. The bore 20 preferably defines an annular recess 64 near the second portion 52. A first sealing means 66 is positioned in the annular recess 64 and a second sealing means 68 is also positioned in the annular recess 64 between the first sealing means 66 and the first end 14 of the body 10.

The stem 24 preferably has a generally cylindrical cross-section and defines a first end 70 and a second end 72. The stem 24 has a threaded portion 74 positioned near the second end 72 which engages with the threads 62 defined by the second cylindrical inside wall portion 58 of the bore 20. The stem 24 defines a first annular flange 76 positioned near the first end of the stem 24 and a second annular flange 78 positioned between the first annular flange 76 and the second end of the stem 24.

In use, the stem 24 is movable from a first position to a second position via the adjustment means. (See FIGS. 2 and 3). The stem is moved to a first position by rotating the stem counter-clockwise so that the second annular flange 78 abuts against the first annular wall portion 60 of the bore 20 when the stem 24 is in the first position. In the first position, the valve means 112 is in a closed position. The stem 24 is moved to a second position by rotating the stem clockwise so that the first end of the stem 24 protrudes from the first end of the body 10. In this position, the first end of the stem 24 contacts a valve means 112 positioned in a coupler 48 adjacent to the body 10. The valve means 112 can be a poppet valve. The valve means 112 therefore can be opened so that hydraulic fluid can be transferred through the charging device to the fluid line 8 in the coupler 48. The first annular flange 76 defines a plurality of slots therein to allow fluid flow, around the stem, to and from the charging device.

Alternatively, the valve means 112 can be opened to release pressure in the hydraulic system and close the downhole valves, generally indicated as number 111 in FIG. 1. The hydraulic system may also be tested in this manner by charging the system and monitoring whether the appropriate valves are open and releasing the pressure to close the valves.

Preferably, the stem 24 defines a nose portion 80 near the first end 70 and a base portion 82 near the second end 72. (See FIGS. 5 and 6). The nose portion 80 has a first end 84 and a second end 86 and the base portion 82 has a first end 88 and a second end 90. The second end 86 of the nose portion 80 is engageably connected to the first end 88 of the base portion 82. The first end 84 of the nose portion 80 has a key 92 positioned therein. The key 92 is received by a slot 94 defined by the first cylindrical inside wall portion 56. The slot 94 is sized so that the nose portion 80 does not rotate while the base portion 82 is rotated to advance the stem 24 towards the second end of the body 10. (See FIG. 7). The key 92 keeps the nose portion 80 from turning while the stem 24 is urged toward and ultimately contacts the valve means 118. This alleviates the problem of damaging the nose of the valve means 118 when the charging device is charging the hydraulic system. Otherwise, when the stem 24 is rotated to extend and push the valve open, the nose portion 80 of the stem 24 is rotating and pushing against the valve means 118, which can cause damage to the valve.

In a preferred embodiment, the second end 86 of the nose portion 80 defines a flange 96 that is received by a slot 98 formed by the first end of the base portion 82, the slot 98 further defines a pair of opposing arms 100 that protrude inwardly to prevent the axial extrication of the nose portion 80.

The stem 24 defines a circumferentially extending slot 120 between the second end of the body 10 and the port. The circumferentially extending slot 120 is used to view the threads as they are rotating.

In another preferred embodiment, there is provided a coupler 48 attached to the substantially flat face 22 of the body 10 by a plurality of bolts 42. The coupler has a first end 102 and a second end 104 and a longitudinal axis 106 extending between the first end 102 and the second end 104. The coupler 48 defines a passage 108 attached to a fluid line 8, wherein a valve means 112 is positioned within the passage 108 adjacent to the first end 102 of the coupler.

The first end 102 of the coupler forms a face 114 having a circular metal seal 116 received by the at least one annular recess 36 on the substantially flat face 22 of the body 10. The valve means 112 is movable from a valve-open position to a valve-closed position when contacted by the stem 24 as shown in FIGS. 2 and 3. The face 114 and the substantially flat face 22 can be sealed by a sealing means 122 such as an o-ring.

The adjustment means comprises a handle means attached to the second end of the stem 24.

In another embodiment of the present invention, there is provided a method for charging a downhole hydraulic system. The method employs a charging device as described above to charge a coupler or hydraulic penetrator, in most cases, with hydraulic fluid. The method includes, providing a coupler as described above. The coupler has a first end and a second end and a longitudinal axis extending between the first end and the second end. The coupler defines a passage attached to tubing or a fluid line that actuates a hydraulic system. A valve means is positioned within the passage adjacent to the first end.

A charging device is sealably attached to the first end of the coupler, the charging device comprises a body having a longitudinal axis, a first end and a second end as described above. The body is formed from a sidewall defining a bore positioned along the longitudinal axis and extending therethrough. The first end forms a substantially flat face and there is a stem having a portion positioned within the bore of the body. The stem is movably mounted in the body and a means for charging the hydraulic system is positioned in communication with the bore.

The charging device is charged with hydraulic fluid. The stem is moved so that the stem contacts the valve means in the coupler and moves the valve means to an open position. The hydraulic system is charged with hydraulic fluid to a desired pressure. A downhole valve is opened with the desired pressure. The valve means in the coupler is then closed to maintain the desired pressure within the hydraulic system so that the downhole valve remains in an open position.

This same method may also be employed to release the pressure from the hydraulic system to close and or test a particular downhole valve. The valve means in the coupler is moved to an open position by the stem and the pressure in the hydraulic system can be bled off through the charging device.

In another embodiment of the present invention, there is provided a method for installing a tubing hanger having a production string depending therefrom in a subsea wellhead while maintaining a hydraulically actuated downhole valve in an open position. The method includes providing a tubing hanger that has a production string depending therefrom. The production string has a hydraulically actuated downhole valve attached thereto. The downhole valve has a hydraulic line attached thereto establishing a hydraulic fluid flow path from the hydraulically operated valve to a coupler containing a poppet valve carried by a carrier means attached to the tubing hanger. A charging device for charging the hydraulic line is connected to the coupler and the coupler and the hydraulic line are charged with hydraulic fluid so that the hydraulically actuated downhole valve is moved to an open position. The hydraulically actuated downhole valve is maintained in an open position because the pressure from the hydraulic line holds the poppet valve in the coupler in a closed position. Finally, the tubing hanger and production string are lowered downhole.

In a preferred embodiment, the charging device is disconnected from the coupler prior to lowering the tubing hanger. The poppet valve can also be seated to seal the hydraulic line prior to lowering the tubing hanger.

Although the preferred embodiments of the invention have been described in detail, it should be understood that various changes, substitutions and alterations can be made therein without departing from the spirit and scope of the invention as defined by the appended claims.

What is claimed is:

1. An apparatus comprising:

a body having a longitudinal axis, a first end and a second end, said body being formed from a sidewall defining a bore positioned along said longitudinal axis and extending therethrough, wherein said first end of said body forms a substantially flat face;

a stem having a portion positioned within the bore of the body and being movably mounted in said body for movement from a first position to a second position with respect to said body;

a port defined through the sidewall communicating with said bore;

a valve means mounted outside of the sidewall and positioned in flow communication with said port, wherein said valve means is adapted to charge said bore with fluid;

a valve coupler having a first end, a second end, a fluid line, and a second valve means disposed within said valve coupler and in flow communication with said fluid line, said first end of said valve coupler being configured to complement said flat face of said body, said valve coupler being connected to a down hole valve of a tubing hanger in a subsea environment;

fastening means adjacent to said first end of said body for matingly attaching said substantially flat face of said first end of said body to said surface of said first end of said valve coupler;

adjustment means attached to said stem for adjusting the position of said stem within said body in such a manner that activation of said stem further actuates said second valve means between an open and closed position in order to communicate fluid flow pressure through said second valve means to selectively charge a downhole valve.

2. The apparatus of claim 1, wherein the substantially flat face of the body defines a periphery and at least one annular recess extending around the longitudinal axis for receiving a circular metal seal.

3. The apparatus of claim 2, wherein the fastening means comprises a flange and a first plurality of bolts extending through the flange parallel to the longitudinal axis of the body, wherein said plurality of bolts are positioned between the periphery and the at least one annular recess.

4. The apparatus of claim 3, wherein said flange defines a channel for receiving a guide means for aligning the apparatus with a coupler.

5. The apparatus of claim 4, wherein the body further comprises a first portion and a second portion, wherein the second portion is attached to the second end of the body by a second plurality of bolts.

6. The apparatus of claim 1, wherein the bore is defined by a first cylindrical inside wall portion near the first end of the body and a second cylindrical inside wall portion that is separated from the first cylindrical inside wall portion by a first annular wall portion facing the first end of the body, wherein the second cylindrical inside wall portion further defines threads.

7. The apparatus of claim 6, wherein the stem has a generally cylindrical cross-section and defines a first end and a second end.

8. The apparatus of claim 7, wherein the stem has a threaded portion positioned near the second end which engages with the threads defined by the second cylindrical inside wall portion of the bore.

9. The apparatus of claim 7, wherein the stem defines a first annular flange positioned near the first end of the stem and a second annular flange positioned between the first annular flange and the second end of the stem.

10. The apparatus of claim 9, wherein the stem is movable from a first position to a second position via the adjustment means, wherein second annular flange abuts against the first annular wall portion of the bore when the stem is moved to said first position.

11. The apparatus of claim 10, wherein the first end of the stem protrudes from the first end of the body when the stem is moved to said first position, so that the first end of the stem contacts the second valve means positioned in said valve coupler adjacent to the body when the stem is in the second position.

12. The apparatus of claim 7, wherein the stem defines a nose portion near the first end and a base portion near the second end, wherein said nose portion has a first end and a second end and said base portion has a first end and a second end, and the second end of said nose portion is engageably connected to the first end of the base portion.

13. The apparatus of claim 12, wherein the first end of said nose portion has a key positioned therein said key being received by a slot defined by the first cylindrical inside wall portion, so that the nose portion does not rotate while the base portion is rotated in a clock wise direction to advance the stem towards the second end of the body.

14. The apparatus of claim 12, wherein the second end of the nose portion defines a flange that is received by a slot formed by the first end of the base portion, said slot further defining a pair of opposing arms that protrude inwardly to prevent the axial extrication of the nose portion.

15. The apparatus of claim 7, wherein the adjustment means comprises a handle means attached to the second end of the stem.

16. The apparatus of claim 1, wherein the bore defines a first annular recess near the second portion, wherein a first sealing means is positioned in the first annular recess and a second sealing means is positioned in the first annular recess between the first sealing means and the first end of the body.

17. The apparatus of claim 1, wherein the stem defines a circumferentially extending slot between the second end of the body and the port.

18. The apparatus of claim 1, wherein said coupler is attached to the substantially flat face of the body by a plurality of bolts, and wherein said coupler further comprises a longitudinal axis extending between first end and the second end.

19. The apparatus of claim 18, wherein said coupler defines a passage having a first end and a second end attached to tubing, and wherein said second valve means is a poppet valve means is positioned within said passage adjacent to the first end.

20. The apparatus of claim 19, wherein the first end of said coupler forms a face having a circular metal seal received by the at least one annular recess on the substantially flat face of the body, wherein said poppet valve means is movable from a valve-open position to a valve-closed position when contacted by said stem.

21. A method for charging a downhole hydraulic system said method comprising:

providing a coupler having a first end and a second end and a longitudinal axis extending between the first end and the second end, said coupler defining a passage having a first end and a second end attached to tubing that actuates a hydraulic system, wherein a valve means is positioned within said passage adjacent to the first end;

sealably attaching a charging device to the first end of the coupler, said charging device comprising a body having a longitudinal axis, a first end and a second end, said body being formed from a sidewall defining a bore positioned along said longitudinal axis and extending therethrough, wherein said first end forms a substantially flat face, a stem having a portion positioned within the bore of the body and being movably mounted in the body, and means for charging a hydraulic system;

charging the charging device with hydraulic fluid from the means for charging a hydraulic system;

moving the stem so that stem contacts the valve means in the coupler and moves the valve means to an open position;

charging the hyrdaulic system with hydraulic fluid to a desired pressure;

opening a downhole valve with the desired pressure;

closing the valve means in the coupler to maintain the desired pressure within the hydraulic system so that said downhole valve remains in an open position.

22. A method for charging a downhole hydraulic system, said method comprising:

providing a valve coupler having a first end and a second end and a longitudinal axis extending between said first end and said second end, said valve coupler defining a passage having a first end and a second end attached to tubing that actuates a hydraulic system, said valve coupler further having a valve means positioned within said passage adjacent to said first end of said passage, wherein said valve coupler is connected to a downhole valve of a tubing hanger in a subsea environment and said valve means is adapted to charge a downhole hydraulic system with fluid;

sealably attaching a charging device to said first end of said valve coupler, said charging device comprising:

a body having a longitudinal axis, a first end and a second end, said body being formed from a sidewall defining a bore positioned along said longitudinal axis and extending therethrough, wherein said first end of said body forms a substantially flat face which is configured to complement said first end of said valve coupler;

a stem having a portion positioned within the bore of the body and being movably mounted in the body for movement from a first position to a second position with respect to said body;

adjustment means attached to said stem for adjusting the position of said stem within said body in such a manner that activation of said stem actuates said valve means between an open and closed position in order to communicate fluid flow through said valve means and to a downhole valve;

fastening means adjacent to said first end of said body for matingly attaching said substantially flat face of said first end of said body to said first end of said valve coupler, and charging means for charging a hydraulic system;

charging said charging device with hydraulic fluid from said charging means;

moving said stem in such a manner that said stem contacts said valve means in said valve coupler and moves said valve means to an open position;

selectively charging the hydraulic system with hydraulic fluid to a desired pressure;

opening a downhole valve with the desired pressure;

closing said valve means in said valve coupler to maintain the desired pressure within the downhole hydraulic system so that said downhole valve remains in an open position.

23. A method for installing a tubing hanger having a production string depending therefrom in a subsea wellhead while maintaining a hydraulically actuated downhole valve in an open position, said method comprising:

providing a tubing hanger having a production string depending therefrom, said production string having a hydraulically actuated downhole valve attached thereto;

providing a valve coupler having a first end and a second end, a longitudinal axis extending between first end and said second end, said coupler defining a passage having a first end and a second end attached to tubing that actuates a hydraulic system, a valve means positioned within said passage adjacent to said first end of said passage, said downhole valve having a hydraulic line attached thereto establishing a hydraulic fluid flow path from the downhole valve to said coupler;

connecting a charging device for charging the hydraulic line to said coupler and subsequently to said downhole valve, said charging device comprising:

a body having a longitudinal axis, a first end and a second end, said body being formed from a sidewall defining a bore positioned along said longitudinal axis and extending therethrough, wherein said first end of said body forms a substantially flat face;

a stem having a portion positioned within the bore of the body and being moveably mounted in the body for movement from a first position to a second position with respect to said body;

adjustment means attached to said stem for adjusting the position of said stem within said body in such a manner that activation of said stem actuates said valve means between an open and closed position in order to communicate fluid flow through said valve means and to a downhole valve, and means for selectively charging a hydraulic system to a desired pressure;

charging said valve coupler and said hydraulic line with a hydraulic fluid such that the hydraulically actuated downhole valve is moved to an open position;

maintaining said hydraulically actuated downhole valve in an open position; and lowering the tubing hanger and production string downhole.

* * * * *